United States Patent Office 3,013,987
Patented Dec. 19, 1961

3,013,987
METAL LOADING OF MOLECULAR SIEVES
Charles R. Castor, Indianapolis, Ind., and Robert M. Milton, White Plains, N.Y., assignors to Union Carbide Corporation, a corporation of New York
No Drawing. Filed Sept. 24, 1958, Ser. No. 762,958
8 Claims. (Cl. 252—455)

This invention relates to a process for preparing metal-loaded zeolitic molecular sieves which are suitable for use as catalysts, scavengers, and getters.

The use of metals as catalysts, scavengers, and getters in a number of chemical reactions and chemical systems is well known in the art. The effectiveness of the metal in such cases has been found to depend, to a considerable degree, on the form in which the metal is present in the reaction zone.

It is an object of this invention to provide a process for introducing metals into the internal adsorption area of zeolitic molecular sieves to provide superior catalysts, scavengers, and getters.

Other objects will be apparent from the subsequent disclosure and appended claims.

The process which satisfies the objects of the present invention comprises intimately contacting an activated zeolitic molecular sieve in an inert atmosphere with a decomposable fluid compound of the metal to be contained in the zeolitic molecular sieve, whereby said decomposable compound is adsorbed by the zeolitic molecular sieve in the inner adsorption region of the zeolitic molecular sieve, and reducing the adsorbed decomposable compound in said activated zeoltic molecular sieves to the elemental metal whereby said elemental metal is retained in the inner adsorption region of said zeolitic molecular sieve. The term "decomposable" is employed herein to mean the capability of the metal compound to be separated into the elemental metal on the one hand and the rest of the compound on the other hand by the processes described in the specification and within the disclosed limitations.

Zeolitic molecular sieves, both natural and synthetic, are metal aluminosilicates. The crystalline structure of these materials is such that a relatively large absorption area is present inside each crystal. Access to this area may be had by way of openings or pores in the crystal. Molecules are selectively adsorbed by molecular sieves on the basis of their size and polarity among other things.

Zeolitic molecular sieves consist basically of three-dimensional frameworks of $SiO_4$ and $AlO_4$ tetrahedra. The tetrahedra are cross-linked by the sharing of oxygen atoms. The electrovalence of the tetrahedra containing aluminum is balanced by the inclusion in the crystal of a cation, for example, metal ions, ammonium ions, amine complexes, or hydrogen ions. The spaces between the tetrahedra may be occupied by water or other adsorbate molecules.

The zeolites may be activated by driving off substantially all of the water of hydration. The space remaining in the crystals after activation is available for adsorption of adsorbate molecules. Any of this space not occupied by elemental metal is available for adsorption of molecules having a size, shape, and energy which permits entry of the adsorbate molecules into the pores of the molecular sieves.

The zeolitic molecular sieves, to be useful in the present invention, must be capable of adsorbing benzene molecules under normal conditions of temperature and pressure. Included among these molecular sieves, and preferred for the purposes of the present invention, are the natural zeolite faujasite, and synthetic zeolites X, Y, L. The natural materials are adequately described in the chemical art. The characteristics of the aforementioned synthetic materials, and the processes for making them, are provided below.

The general formula for zeolite X, expressed in terms of mol fractions of oxides, is as follows:

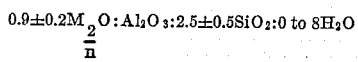

In the formula "M" represents a cation, for example hydrogen or a metal, and "$n$" its valence. The zeolite is activated or made capable of adsorbing certain molecules by the removal of water from the crystal as by heating. Thus the actual number of mols of water present in the crystal will depend upon the degree of dehydration or activation of the crystal. Heating to temperatures of about 350° C. has been found sufficient to remove substantially all of the adsorbed water.

The cation represented in the formula above by the letter "M" can be changed by conventional ion-exchange techniques. The sodium form of the zeolite, designated sodium zeolite X, is the most convenient to manufacture. For this reason the other forms of zeolite X are usually obtained by the modification of sodium zeolite X.

The typical formula for sodium zeolite X is $$0.9Na_2O:Al_2O_3:2.5SiO_2:6.1H_2O$$

The major lines in the X-ray diffraction pattern of zeolite X are set forth in Table A below:

TABLE A

| $d$ Value of Reflection in A. | 100 I/I₀ |
|---|---|
| 14.42±0.2 | 100 |
| 8.82±0.1 | 18 |
| 4.41±0.05 | 9 |
| 3.80±0.05 | 21 |
| 3.33±0.05 | 18 |
| 2.88±0.05 | 19 |
| 2.79±0.05 | 8 |
| 2.66±0.05 | 8 |

In obtaining the X-ray diffraction powder patterns, standard techniques were employed. The radiation was the $K_0C$ doublet of copper, and a Geiger counter spectrometer with a strip chart pen recorder was used. The peak heights, I, and the positions as a function of $2\theta$, where $\theta$ is the Bragg angle, were read from the spectrometer charge. From these, the relative intensities,

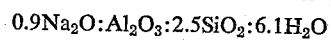

where $I_0$ is the intensity of the strongest line or peak, and $d(obs)$ the interplanar spacing in A., corresponding to the recorded lines were calculated. The X-ray patterns indicate a cubic unit cell of dimensions between 24.5 A. and 25.5 A.

To make sodium zeolite X, reactants are mixed in aqueous solution and held at about 100° C. until the crystals of zeolite are formed. Preferably the reactants should be such that in the solution the following ratios prevail:

| | |
|---|---|
| $SiO_2/Al_2O_3$ | 3–5 |
| $Na_2O/SiO_2$ | 1.2–1.5 |
| $H_2O/Na_2O$ | 35–60 |

The chemical formula for zeolite Y expressed in terms of oxides mole ratios may be written as

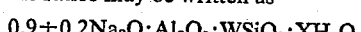

wherein "W" is a value greater than 3 up to about 5 and "X" may be a value up to about 9.

Zeolite Y has a characteristic X-ray powder diffraction pattern which may be employed to identify zeolite Y. The X-ray powder diffraction data are shown in Table B. The values for the interplanar spacing, $d$, are expressed in angstrom units. The relative intensity of the lines of the X-ray powder diffraction data are expressed as VS, very strong; S, strong; M, medium; W, weak; and VW, very weak.

TABLE B

| hkl | $h^2+k^2+l^2$ | d in A. | Intensity |
|---|---|---|---|
| 111 | 3 | 14.3–14.4 | VS |
| 220 | 8 | 8.73–8.80 | M |
| 311 | 11 | 7.45–7.50 | M |
| 331 | 19 | 5.67–5.71 | S |
| 333, 511 | 27 | 4.75–5.08 | M |
| 440 | 32 | 4.37–4.79 | M |
| 620 | 40 | 3.90–4.46 | W |
| 533 | 43 | 3.77–3.93 | S |
| 444 | 48 | 3.57–3.79 | VW |
| 551, 711 | 51 | 3.46–3.48 | VW |
| 642 | 56 | 3.30–3.33 | S |
| 553, 731 | 59 | 3.22–3.24 | W |
| 733 | 67 | 3.02–3.04 | M |
| 660, 822 | 72 | 2.91–2.93 | M |
| 555, 751 | 75 | 2.85–2.87 | S |
| 840 | 80 | 2.76–2.78 | M |
| 753, 911 | 83 | 2.71–2.73 | W |
| 664 | 88 | 2.63–2.65 | M |
| 931 | 91 | 2.59–2.61 | M |
| 844 | 96 | 2.52–2.54 | VW |
| 862; 10, 2, 0 | 104 | 2.42–2.44 | VW |
| 666; 10, 2, 2 | 108 | 2.38–2.39 | M |
| 775; 11, 1, 1 | 123 | 2.22–2.24 | VW |
| 880 | 128 | 2.18–2.20 | W |
| 955; 971; 11, 3, 1 | 131 | 2.16–2.18 | VW |
| 973; 11, 3, 3 | 139 | 2.10–2.11 | W |
| 884; 12, 0, 0 | 144 | 2.06–2.07 | VW |
| 886; 10, 8, 0; 12, 4, 2 | 164 | 1.93–1.94 | VW |
| 10, 8, 2 | 168 | 1.91–1.92 | VW |
| 995; 13, 3, 3 | 187 | 1.81–1.82 | VW |
| 11, 7, 5; 13, 5, 1 | 195 | 1.77–1.78 | VW |
| 10, 8, 6; 10, 10, 0; 14, 2, 0 | 200 | 1.75–1.78 | W |
| 997; 11, 9, 3 | 211 | 1.70–1.71 | W |

When an aqueous colloidal silica sol employed as the major source of silica, zeolite Y may be prepared by preparing an aqueous sodium aluminosilicate mixture having a composition, expressed in terms of oxide-mole-ratios, which falls within one of the following ranges:

| | Range 1 | Range 2 | Range 3 |
|---|---|---|---|
| $Na_2O/SiO_2$ | 0.20 to 0.40 | 0.41 to 0.61 | 0.61 to 0.80 |
| $SiO_2/Al_2O_3$ | 10 to 40 | 10 to 30 | 7 to 30 |
| $H_2O/Na_2O$ | 25 to 60 | 20 to 60 | 20 to 60 | maintaining the mixture at a temperature of about 100° C. until crystals are formed, and separating the crystals from the mother liquor.

When sodium silicate is employed as the major source of silica, zeolite Y may be prepared by preparing an aqueous sodium aluminosilicate mixture having a composition, expressed in terms of oxide-mole-ratios, falling within one of the following ranges:

| | Range 1 | Range 2 | Range 3 |
|---|---|---|---|
| $Na_2O/SiO_2$ | 0.6 to 1.0 | 1.5 to 1.7 | 1.9 to 2.1 |
| $SiO_2/Al_2O_3$ | 8 to 30 | 10 to 30 | about 10 |
| $H_2O/Na_2O$ | 12 to 90 | 20 to 90 | 40 to 90 | maintaining the mixture at a temperature of about 100° C. until crystals are formed, and separating the crystals from the mother liquor.

The composition of zeolite L, expressed in terms of mole ratios of oxides, may be represented as follows:

$$1.0 \pm 0.2 M_{\frac{2}{n}}O : Al_2O_3 : 6.4 \pm 0.5 SiO_2 : YH_2O$$

wherein "M" designates a metal, "n" represents the valence of "M"; and "y" may be any value from 0 to about 7.

The more significant d(A.) values, i.e., interplanar spacings, for the major lines in the X-ray diffraction pattern of zeolite L, are given below in Table C.

TABLE C

| | |
|---|---|
| 16.1±0.3 | 3.17±0.01 |
| 7.52±0.04 | 3.07±0.01 |
| 6.00±0.02 | 2.91±0.01 |
| 4.57±0.03 | 2.65±0.01 |
| 4.35±0.04 | 2.46±0.01 |
| 3.91±0.02 | 2.42±0.01 |
| 3.47±0.02 | 2.19±0.01 |
| 3.28±0.02 | |

Although there are a number of cations that may be present in zeolite L, it is preferred to synthesize the potassium and potassium-sodium forms of the zeolite, i.e., the form in which the exchangeable cations present are substantially all potassium or potassium and sodium ions. The reactants accordingly employed are readily available and generally water soluble. The exchangeable cations present in the zeolite may then conveniently be replaced by other exchangeable cations.

The potassium or potassium-sodium forms of zeolite L may be prepared by preparing an aqueous metal aluminosilicate mixture having a composition, expressed in terms of mole ratios of oxides falling within the following range:

$K_2O/(K_2O+Na_2O)$ _____ From about 0.33 to about 1.
$(K_2O+Na_2O)/SiO_2$ _____ From about 0.4 to about 0.5.
$SiO_2/Al_2O_3$ _____ From about 15 to about 28.
$H_2O/(K_2O+Na_2O)$ _____ From about 15 to about 41.

maintaining the mixture at a temperature of about 100° C. until crystallization occurs, and separating the crystals from the mother liquor.

To prepare the elemental metal-containing zeolitic molecular sieves of the present invention it is necessary to activate the zeolitic molecular sieve prior to adsorption of the decomposable metal compound. This may be accomplished by heating the zeolitic molecular sieve up to a temperature of about 350° C. in a flowing stream of inert dry gas or in vacuum. It has been found advantageous to remove as much of the water from the zeolitic molecular sieve as is possible without destroying the crystal structure. Not only is it then possible to absorb more of the fluid decomposable metal compound, but also a very high dispersion of the metal throughout the adsorption region following decomposition and reduction is obtained. The metal so dispersed has a high specific surface with a corresponding high chemical and catalytic activity.

The pore size of the zeolitic molecular sieves which are useful in the present invention must be sufficiently large to permit adsorption of benzene. Molecular sieves having smaller pores will not readily permit entry of the decomposable fluid metal compounds into the inner adsorption area of the crystal.

The activated zeolitic molecular sieve is then brought into intimate contact with the decomposable fluid metal compound. The materials which may be loaded in the large pored zeolitic molecular sieves by the present process are copper, silver, gold, platinum, palladium, rhodium, zinc, cadmium, aluminum, tin, lead, chromium, molybdenum, tungsten, manganese, rhenium, iron, cobalt, nickel, titanium, zirconium, vanadium and hafnium. The reducible compounds of these materials which are found to be particularly suitable are the carbonyls, carbonyl hydrides, acetyl acetonate complexes of the metals in the zero valence state, reducible halides, metal alkyls and other metal-organic compounds such as cyclopentadienyl metal compounds and ethylenic complex compounds of the noble metals. Of these metals those falling in groups VIB, VIIB, and VIII of the periodic table (Handbook of Chemistry and Physics, Thirty-first Edition, page 336, Chemical Rubber Publishing Co., 1949) are most suitably introduced to the molecular sieve as carbonyl or carbonyl hydrides, those falling in group IB as acetyl acetonate complexes with the metal in the zero valence state, those falling in groups IIA, IIIA, and IVA as the metal alkyls and those falling in group IVB as the volatile halides.

The reduction of the compound may be either chemical or thermal. In the case of chemical reduction the reducing agent may be deposited first in the inner sorption area and the reducible compound introduced subsequently, or alternatively the reducible compound may be sorbed into the inner sorption area and the reducing agent introduced subsequently. These several variations of thermal and chemical reductions are illustrated in the following examples.

*Example I*

A portion of zeolite X (22.7 grams) was activated by heating it to 350° C. This activated zeolite was treated with volatile iron pentacarbonyl under reduced pressure until adsorption of the carbonyl by the zeolite ceased. The treated material was heated slowly to 250° C. under a purging stream of nitrogen until the iron pentacarbonyl was decomposed leaving elemental iron in the crystals of zeolite X. The zeolite X assumed a deep purple color. It was found that the iron-loaded zeolite was highly reactive to oxidation. As soon as the material was exposed to air, the color of a portion of it changed from purple to the characteristic color of iron oxide while some of the iron-loaded zeolite turned black after the exposure. It was shown by the behaviour of the material in a magnetic field that the different colors were due to the presence of different oxides of iron. The oxidized material was analyzed. The results of the analysis indicated 8.1 weight-percent iron in the zeolite pores. Adsorption data indicated that the iron-loaded zeolite X contained 8.2 weight-percent iron prior to the decomposition of the iron carbonyl. This agreement in iron content indicated that a negligible amount of $Fe(CO)_5$ was desorbed in the decomposition process and that practically quantative decomposition took place.

*Example II*

The preparation of nickel-loaded zeolite X was carried out in the same manner as the preparation of the iron-containing material except that nickel tetracarbonyl was used. The resulting product was similar to the iron-loaded zeolite except that it was a gray color. No noticeable color change occurred on exposure to air.

*Example III*

Copper acetylacetonate (1 gram) was dissolved in 50 milliliters of chloroform. To this solution was added 10 grams of activated zeolite X powder. The resulting slurry was allowed to stand for about 30 minutes. The powder was then filtered off and purged with dry hydrogen gas to remove the last traces of chloroform. The dry powder was heated to about 400° C. for 4 hours under a dry hydrogen purge to decompose the adsorbed copper salt. X-ray diffraction analysis of the resulting product indicated the retention of the zeolite X structure and the presence of copper in the zeolite X.

Experimental results indicate that decomposable compounds can be adsorbed by molecular sieves when the compounds are either gaseous, liquid or in solution. Accordingly, the term fluid is employed herein to include gases, liquids, and solutions. Care should be taken, of course, to avoid heating the compounds to their decomposition temperatures prior to their adsorption by the molecular sieves. Care should be taken to avoid heating the zeolitic molecular sieves to a temperature at which destruction of the crystal structure occurs. The carbonyls used in the foregoing examples decompose at temperatures above about 150° C. and for that reason it is preferred to adsorb these carbonyls at temperatures below about 100° C. Best results have been obtained when the adsorption and desorption are carried out under reduced pressure, but the processes described above are also operable at atmospheric or higher pressures.

In addition to the thermal decomposition of the adsorbed metal-containing compound, the decomposition may be effected by the chemical reaction of the compound and another material. For example, hydrogen will react under the proper conditions of temperature and pressure with metallic cyclopentadienyls to produce elemental metal. At pressures of between about 1000 and 2000 p.s.i.g. and at temperatures of from about 100° C. to 140° C., nickel and cobalt cyclopentadienyl break down in the presence of hydrogen to form nickel and cobalt, respectively. Metal halides may also be reduced to metal by hydrogen or other materials such as metallic sodium. This procedure whereby the reaction of two or more materials is employed to effect the deposition of elemental metal in a molecular sieve is illustrated in Examples IV and V.

*Example IV*

Bis(cyclopentadienyl) nickel (10 grams) was dissolved in 100 milliliters of n-heptane at 95° C. Zeolite X powder (50 grams) which had previously been activated at 375° C. was added, and the slurry was refluxed in an argon atmosphere for two hours. This was done to allow diffusion of the nickel compound into the pores of the zeolite. The slurry was transferred to a 300 milliliter pressure vessel and put in an autoclave. Hydrogen gas was introduced into the vessel until the pressure reached 1200 p.s.i.g. The temperature of the reactor and contents was slowly increased at the rate of about 1° C. per minute. At 80° C. a slight pressure drop of 1280 to 1200 p.s.i.g. occurred followed by a leveling off of the pressure. This indicated adsorption of the hydrogen by the zeolite. At 105° C. a major pressure drop occurred from 1200 to 1000 p.s.i.g. The pressure leveled off at about 1000 p.s.i.g. This pressure drop indicated hydrogenation of the cyclopentadienyl compound. The vessel was then cooled to room temperature, vented, and the slurry was removed to be dried under an inert atmosphere. The nickel-containing zeolite product was a uniform jet-black color.

*Example V*

A platinum-ethylenic complex compound was prepared by refluxing anhydrous sodium hexachloroplatinate (6 grams) with absolute ethanol (50 milliliters). The complete reaction of the sodium hexachloroplatinate was insured by the addition of saturated ammonium chloride solution which precipitated unreacted sodium hexachloroplatinate as an insoluble ammonium salt. The resulting solution was evaporated to dryness and the platinum-ethylenic complex was extracted with chloroform (150 milliliters). Zeolite X powder (5 grams) was added to the solution and shaken for one hour to permit the adsorption of the platinum-ethylenic complex from the solution by the zeolite. The solution was then filtered and the zeolite dried. The zeolite was treated with hydrogen at 150° C. to reduce the adsorbed platinum-ethylenic complex to free platinum metal. The resulting product was zeolite X containing 2.18 percent by weight metallic platinum as determined by elemental analysis.

*Example VI*

Ten grams of sodium zeolite Y powder

$SiO_2/Al_2O_3=4.4$ which had been activated by heating at 350° C. to drive off the intracrystalline water was mixed with 2 grams of bis-toluene chromium, and heated in a closed tube at 95° C. for two hours. This resulted in adsorption of the chromium compound into the pore system of the molecular sieve zeolite. This was then heated to 375° C. in a flowing stream of argon gas causing decomposition of the bis-toluene chromium and deposition of chromium metal within the zeolite. Analysis showed 4.9 weight percent chromium was deposited in the zeolite.

*Example VII*

To illustrate the multiple loading of metals in a molecular sieve, 0.509 gram of activated sodium X powder was cyclicly treated by adsorption of nickel carbonyl vapors at 25° C. followed by heating to between 160° C. and 185° C. to decompose the nickel carbonyl while at the same time evacuating the evolved carbon monoxide. After 43 cycles, the sample weight had increased 212 weight-percent. It was estimated that at this point about 80 percent of the volume of the large pores of the molecular sieve were filled with elemental metal. The product exhibited ferromagnetic properties.

The physical properties of this product such as its higher density and the fact that it exhibited ferromagnetism indicate that it could be employed in structural or electrical applications. Its utility as a catalytic agent would be enhanced for those processes wherein a gradual loss of the metal might occur.

*Example VIII*

A glass tube was charged with 15 grams of activated sodium zeolite X pellets and 4 grams of chromium hexacarbonyl in separate zones with glass wool plugs between and outside the zones. The tube was heated to 100° C. in an electric furnace while a flow of argon was maintained through the tube from the chromium carbonyl zone through the zeolite zone. These conditions were maintained for several hours following which the temperature was raised to 375° C. to decompose the adsorbed chromium carbonyl yielding elemental chromium deposited with the sodium zeolite X. Upon exposure to air the active chromium oxidized with considerable heat being developed.

*Example IX*

Twenty-one grams of activated sodium zeolite X, 14 x 30 mesh crushed pellets, and 4 grams of molybdenum hexacarbonyl were placed in a Pyrex glass tube (3 cm. O.D., 58 cm. length) and separated by a glass wool plug. This was then heated in a furnace to 100° C. with a slow stream of argon flowing over the carbonyl first and subsequently passed over the zeolite to adsorb the molybdenum carbonyl.

After all the molybdenum carbonyl had been adsorbed on the zeolite, the product was heated to 375° C. A molybdenum-loaded sodium zeolite Z containing 6.5 weight percent molybdenum was obtained.

*Example X*

Fifty grams of activated sodium zeolite X were placed in a flask and heated to 125° C. in argon. Then 6 grams of lump sodium were added with stirring and after dispersion in the zeolite, 12.4 grams of titanium tetrachloride was added slowly with continued stirring. After reaction was completed the material had a jet black color which turned light gray when exposed to air. It contained 6.2 percent titanium.

*Example XI*

Activated sodium zeolite X was treated with a chloroform solution of cobalt acetylacetonate until a substantial quantity of the cobalt acetylacetonate was adsorbed. The sodium zeolite X containing the adsorbed material was then subjected to a stream of hydrogen at 350° C. whereby the cobalt acetylacetonate was decomposed to cobalt metal. The product contained 0.3 weight-percent of cobalt.

The products produced by the process of the present invention are quite useful as catalysts, and particularly as selective catalysts for the specific catalysis of reactants which are mixed with other materials which are not adsorbed by the zeolitic molecular sieve. The adsorbed reactants react leaving the non-adsorbed materials unreacted.

Similarly, the products are useful as selective getters, gettering certain components of a mixture without affecting the other components.

The metal-containing zeolitic molecular sieves are useful as a means for effecting the controlled addition of metals to reaction systems.

Still another advantage of the use of metal-loaded zeolitic molecular sieves resides in the fact that the tendency for the metal to migrate is minimized. Normal catalysts consisting of supported metals exhibit migration of the metal during catalysis thereby giving rise to unequal distribution of catalyst material with corresponding decrease in catalytic effectiveness.

Additionally, these metal-loaded zeolitic molecular sieves may be employed for the production of molecular sieves loaded with other materials. For example, a chromium-containing zeolitic molecular sieve may be subjected to mild oxidizing treatment whereby the chromium metal is converted to chromium oxides. The chromium-oxide-loaded molecular sieve may then be used as a superior selective chrome oxide catalyst.

These metal-loaded zeolitic molecular sieves particularly those containing the ferromagnetic metals, may be advantageously utilized in electrical and/or magnetic applications.

Zeolite X is described and claimed in U.S. patent application Serial No. 400,389, filed December 24, 1953, now U.S. Patent No. 2,882,244.

Zeolite Y is described and claimed in U.S. patent application Serial No. 728,057, filed April 14, 1958.

Zeolite L is described and claimed in U.S. patent application Serial No. 711,565, filed January 28, 1958.

What is claimed is:

1. A process for introducing elemental titanium metal into the internal adsorption region of rigid three-dimensional crystalline metal aluminosilicate zeolites of the molecular sieve type which comprises intimately contacting a dehydrated, rigid three-dimensional crystalline metal aluminosilicate zeolite of the molecular sieve type with at least one volatile halide of titanium whereby said volatile halide is adsorbed into the inner adsorption region of said crystalline metal aluminosilicate zeolite, said crystalline metal aluminosilicate zeolite being capable of adsorbing benzene internally; and introducing a reducing agent into the inner adsorption region of said crystalline metal aluminosilicate zeolite whereby said volatile halide is reduced to the elemental titanium metal.

2. A process for introducing elemental metal into the into the internal adsorption region of rigid three-dimensional crystalline metal aluminosilicate zeolites of the molecular sieve type which comprises intimately contacting in an inert atmosphere a dehydrated rigid three-dimensional crystalline metal aluminosilicate zeolite of the molecular sieve type, such zeolite being capable of adsorbing benzene internally, with a decomposable fluid compound of the metal to be contained in said crystalline metal aluminosilicate zeolite, such decomposable compound being capable of being reduced to elemental metal at a temperature below the crystal destruction temperature of such zeolite, whereby said decomposable compound is adsorbed into the inner adsorption region of said crystalline metal aluminosilicate zeolite and reducing said adsorbed decomposable compound to the elemental metal.

3. A process for introducing elemental metal into the internal adsorption region of rigid three-dimensional crystalline metal aluminosilicate zeolites of the molecular sieve type which comprises intimately contacting a dehydrated rigid three-dimensional crystalline metal aluminosilicate zeolite of the molecular sieve type, such zeolite being capable of adsorbing benzene internally, with at least one decomposable compound selected from the group consisting of carbonyls and carbonyl hydrides of manganese, thenium, and metals of groups VI B and VIII of the periodic table whereby said decomposable compound is adsorbed in the inner adsorption region of said crystalline metal aluminosilicate zeolite and heating said crystalline metal aluminosilicate zeolite containing said adsorbed carbonyl to an elevated temperature below the temperature of substantial crystal destruction whereby said decomposable compound is thermally reduced to the elemental metal.

4. A process for introducing elemental metal into the internal adsorption region of rigid three-dimensional crystalline metal aluminosilicate zeolites of the molecular sieve type which comprises intimately contacting in an inert atmosphere a dehydrated rigid three-dimensional crystalline metal aluminosilicate zeolite of the molecular sieve type, such zeolite being capable of adsorbing benzene internally, with at least one fluid acetylacetonate complex compound of a periodic table group I B metal wherein the metal is in the zero valence state whereby said complex compound is adsorbed in the inner adsorption region of said crystalline metal aluminosilicate zeolite and heating said crystalline metal aluminosilicate zeolite containing said adsorbed acetylacetonate to an elevated temperature below the temperature of substantial crystal destruction whereby said decomposable compound is thermally reduced to the elemental metal.

5. A process for introducing elemental metal into the internal adsorption region of rigid three-dimensional crystalline metal aluminosilicate zeolites of the molecular sieve type which comprises intimately contacting in an inert atmosphere a dehydrated rigid three-dimensional crystalline metal aluminosilicate zeolite of the molecular sieve type, such zeolite being capable of adsorbing benzene internally, with at least one alkyl of a metal selected from the group of metals of groups II A, III A, and IV A of the periodic table whereby said alkyl is adsorbed into the inner adsorption region of said crystalline metal aluminosilicate zeolite, and introducing a reducing agent into the inner adsorption region of said crystalline metal aluminosilicate zeolite whereby said adsorbed metal alkyl is decomposed to the elemental metal.

6. A process for introducing elemental metal into the internal adsorption region of rigid three-dimensional crystalline metal aluminosilicate zeolites of the molecular sieve type which comprises intimately contacting in an inert atmosphere a dehydrated rigid three-dimensional crystalline metal aluminosilicate zeolite of the molecular sieve type, such zeolite being capable of adsorbing benzene internally, with at least one volatile halide of a metal of Group IV B of the periodic table whereby said volatile halide is adsorbed into the inner adsorption region of said crystalline metal aluminosilicate zeolite, and introducing a reducing agent into the inner adsorption region of said crystalline metal aluminosilicate zeolite whereby said volatile metal halide is reduced to the elemental metal.

7. A process as described in claim 2 wherein a reducing agent is introduced into the inner adsorption region of said dehydrated crystalline metal aluminosilicate zeolite prior to the contacting with said decomposable fluid compound.

8. A process as described in claim 6 wherein the reducing agent is introduced into the inner adsorption region of said dehydrated crystalline metal aluminosilicate zeolite prior to the contacting with said volatile halide of a metal of group IV B of the periodic table.

References Cited in the file of this patent

UNITED STATES PATENTS

| | | |
|---|---|---|
| 1,840,450 | Jaeger et al. | Jan. 12, 1932 |
| 2,617,712 | Bond | Nov. 11, 1952 |
| 2,882,243 | Milton | Apr. 14, 1959 |
| 2,882,244 | Milton | Apr. 14, 1959 |

UNITED STATES PATENT OFFICE
CERTIFICATE OF CORRECTION

Patent No. 3,013,987            December 19, 1961

Charles R. Castor et al.

It is hereby certified that error appears in the above numbered patent requiring correction and that the said Letters Patent should read as corrected below.

Column 7, line 44, for "Z" read -- X --; column 8, line 70, for "thenium" read -- rhenium --.

Signed and sealed this 9th day of October 1962.

(SEAL)
Attest:

ERNEST W. SWIDER
Attesting Officer

DAVID L. LADD
Commissioner of Patents